US009988042B2

(12) United States Patent
Higa et al.

(10) Patent No.: US 9,988,042 B2
(45) Date of Patent: Jun. 5, 2018

(54) HYBRID VEHICLE

(71) Applicant: TOYOTA JIDOSHA KABUSHIKI KAISHA, Toyota-shi, Aichi-ken (JP)

(72) Inventors: Mitsuaki Higa, Toyota (JP); Shinichi Sugai, Toyota (JP); Daisuke Itoyama, Toyota (JP); Mitsuyori Matsumura, Seto (JP); Tsubasa Migita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/797,204

(22) Filed: Oct. 30, 2017

(65) Prior Publication Data

US 2018/0126979 A1   May 10, 2018

(30) Foreign Application Priority Data

Nov. 8, 2016  (JP) ................. 2016-218057

(51) Int. Cl.
*B60W 20/15* (2016.01)
*B60W 10/06* (2006.01)
*B60W 10/08* (2006.01)
*B60W 10/196* (2012.01)
*B60K 6/46* (2007.10)
(Continued)

(52) U.S. Cl.
CPC ............. *B60W 20/15* (2016.01); *B60K 6/365* (2013.01); *B60K 6/46* (2013.01); *B60W 10/06* (2013.01); *B60W 10/08* (2013.01); *B60W 10/196* (2013.01); *F01N 3/023* (2013.01); *F02D 41/0235* (2013.01); *B60W 2510/10* (2013.01); *B60W 2520/10* (2013.01); *B60W 2710/0644* (2013.01); *B60W 2710/086* (2013.01);
(Continued)

(58) Field of Classification Search
CPC .. B60W 20/15; F01N 3/00; F01N 3/18; F01N 1/00; F01N 3/20
See application file for complete search history.

(56) References Cited

U.S. PATENT DOCUMENTS 6,785,603 B2 *  8/2004  Inoue .................... F02D 41/042
                                                      123/198 F
7,216,479 B2 *  5/2007  Tamura .................... F02D 9/04
                                                      60/285
(Continued)

FOREIGN PATENT DOCUMENTS

JP       2015-202832        11/2015
WO    WO 2015/159218 A2     10/2015

*Primary Examiner* — John D Walters
*Assistant Examiner* — James J Triggs
(74) *Attorney, Agent, or Firm* — Finnegan, Henderson, Farabow, Garrett & Dunner, LLP

(57) ABSTRACT

When an output of a braking force to a driving shaft is needed, and a needed braking force can be output by regenerative drive of the second motor, the engine self-sustainably operates, the regenerative drive of the second motor is performed to cause the second motor to output the needed braking force to the driving shaft. When the needed braking force cannot be output by the regenerative drive of the second motor, the needed braking force is output to the driving shaft by the regenerative drive of the second motor and motoring of the engine that performs fuel cut using the first motor. When a filter regeneration condition is established, an allowable input electric power is set to be lower than that of when the filter regeneration condition is not established.

6 Claims, 5 Drawing Sheets

(51) Int. Cl.
 *F01N 3/023* (2006.01)
 *F02D 41/02* (2006.01)
 *B60K 6/365* (2007.10)

(52) U.S. Cl.
 CPC ....... *F02D 2200/101* (2013.01); *Y10S 903/91* (2013.01); *Y10S 903/93* (2013.01)

(56) References Cited

U.S. PATENT DOCUMENTS

| | | | | |
|---|---|---|---|---|
| 7,489,994 | B2 * | 2/2009 | Isono | F02D 41/1401 340/438 |
| 7,877,985 | B2 * | 2/2011 | Hashizume | F01N 3/023 60/287 |
| 7,958,957 | B2 * | 6/2011 | Suzuki | B60L 15/2045 180/65.265 |
| 8,914,172 | B2 * | 12/2014 | Shiino | B60W 20/15 701/22 |

* cited by examiner

HYBRID VEHICLE

INCORPORATION BY REFERENCE

The disclosure of Japanese Patent Application No. 2016-218057 filed on Nov. 8, 2016 including the specification, drawings and abstract is incorporated herein by reference in its entirety.

BACKGROUND

1. Technical Field

The present disclosure relates to a hybrid vehicle, and particularly to a hybrid vehicle including an engine having a filter that removes particulate matter in an exhaust passage, a planetary gear, two motors, and a power storage device.

2. Description of Related Art

In the related art, a hybrid vehicle in which an engine having a filter attached to an exhaust passage to remove particulate matter, a first motor generator, and a driving shaft and a second motor generator that are connected to driving wheels are connected to three shafts of a power split device (planetary gear mechanism) and electric power is exchanged between the first and second motor generators and a battery is proposed (example, refer to Japanese Unexamined Patent Application Publication No. 2015-202832 (JP 2015-202832 A)). When regeneration of the filter is needed, the hybrid vehicle expands a control range of the residual capacity (SOC) of the battery, decreases the SOC of the battery below the lower limit of the control range before the expansion, thereafter increases the SOC above the upper limit of the control range before the expansion, and then stops the injection of a fuel into the engine. When the temperature of the filter is within a regenerable temperature range suitable for regeneration and the injection of the fuel into the engine is stopped, air containing oxygen is supplied to the filter to burn the particulate matte. In this manner, regeneration of the filter is performed. As described above, when regeneration of the filter is needed, the control range of the SOC is expanded to reduce the SOC. Therefore, compared to a case where the SOC is not reduced, the subsequent operation time of the engine is prolonged to ensure the operation time of the engine needed to increase the temperature of the filter to the regenerable temperature range and rapidly regenerate the filter.

SUMMARY

In the hybrid vehicle, when the output of a braking force to the driving shaft is needed, and a needed braking force can be output by regenerative drive of a second motor generator within a range of an allowable input electric power of a power storage device, instead of motoring the engine using the first motor generator by stopping the injection of the fuel into the engine, the output of the needed braking force to the driving shaft is performed by the regenerative drive of the second motor generator while allowing the engine in a self-sustainable operation. This is because the output of the needed braking force described above results in the improvement of the energy efficiency of the vehicle. Therefore, when regeneration of the filter is needed and the temperature of the filter is within a regenerable temperature range (when regeneration of the filter is possible), there may be cases where there are less opportunities for stopping the injection of the fuel into the engine and regeneration of the filter is not satisfactorily performed.

The present disclosure provides a hybrid vehicle that secures an opportunity for regeneration of a filter when regeneration of the filter is possible.

An aspect of the present disclosure relates to a hybrid vehicle including: an engine having a filter that removes particulate matter in an exhaust passage; a first motor a planetary gear having three rotating elements; a second motor connected to a driving shaft; a power storage device configured to exchange electric power with the first motor and the second motor, and an electronic control unit. The planetary gear is configured such that the three rotating elements are arranged in order in a collinear diagram. The three rotating elements are respectively connected to the first motor, the engine, and the driving shaft connected to an axle of the hybrid vehicle in the order that the three rotating elements are arranged in the collinear diagram. When an output of a braking force to the driving shaft is needed, and a needed braking force can be output by regenerative drive of the second motor within a range of an allowable input electric power of the power storage device, the electronic control unit is configured to control the engine to self-sustainably operate and control the second motor to perform the regenerative drive to cause the second motor to output the needed braking force to the driving shaft. When the output of the braking force to the driving shaft is needed, and the needed braking force cannot be output by the regenerative drive of the second motor within the range of the allowable input electric power of the power storage device, the electronic control unit is configured to control the engine, the first motor, and the second motor such that the needed braking force is output to the driving shaft by the regenerative drive of the second motor and motoring of the engine that performs fuel cut using the first motor. When a filter regeneration condition that an accumulation amount of the particulate matter on the filter is equal to or more than a predetermined accumulation amount and a temperature of the filter is equal to or higher than a predetermined temperature is established, the electronic control unit is configured to set the allowable input electric power to be lower than that of when the filter regeneration condition is not established.

According to the aspect, when the output of the braking force to the driving shaft is needed, and the needed braking force can be output by the regenerative drive of the second motor within the range of the allowable input electric power of the power storage device, the electronic control unit controls the engine to self-sustainably operate and controls the second motor to perform the regenerative drive to cause the second motor to output the needed braking force to the driving shaft. On the other hand, when the needed braking force cannot be output by the regenerative drive of the second motor within the range of the allowable input electric power of the power storage device, the needed braking force is output to the driving shaft by the regenerative drive of the second motor and motoring of the engine that performs fuel cut using the first motor. In addition, when the control is performed, and the filter regeneration condition that the accumulation amount of the particulate matter on the filter is equal to or more than the predetermined accumulation amount and the temperature of the filter is equal to or higher than the predetermined temperature is established, the electronic control unit sets the allowable input electric power to be lower then that of when the filter regeneration condition is not established. Accordingly, when the filter regeneration condition is established, and the output of the braking force to the driving shaft is needed, the electronic control unit easily determines that the needed torque cannot be output by the regenerative drive of the second motor within the range of the allowable input electric power of the power storage device, and the fuel cut of the engine is easily performed. As a result, an opportunity for regeneration of the filter can be secured.

In the hybrid vehicle according to the aspect, when the filter regeneration condition is established, the electronic control unit may be configured to set the allowable input electric power such that the allowable input electric power at a second position, at which the needed braking force is higher than that of when a shift position of the hybrid vehicle is a first position, is lower than the allowable input electric power of when the shift position is the first position. According to the aspect, when the filter regeneration condition is established, and the output of the braking force to the driving shaft is needed when the shift position is the second position, the fuel cut of the engine is easily performed, and an opportunity for regeneration of the filter can be more reliably secured.

In the hybrid vehicle according to the aspect, the electronic control unit may be configured to control the engine to cause the engine to self-sustainably operate at a rotational speed lower limit when the output of the braking force to the driving shaft is needed. The electronic control unit may be configured to set the rotational speed lower limit such that the rotational speed lower limit when the filter regeneration condition is established is higher than the rotational speed lower limit when the filter regeneration condition is not established. According to the aspect, when the filter regeneration condition is established, and the engine that performs fuel cut is motored by the first motor, a larger amount of air (oxygen) can be supplied to the filter, and the time needed to complete the regeneration of the filter can be shortened.

In the hybrid vehicle according to the aspect, when the filter regeneration condition may be established, the electronic control unit is configured to set the rotational speed lower limit such that the rotational speed lower limit at a second position, at which the needed braking force is higher than that of when a shift position is a first position, is higher than the rotational speed lower limit of when the shift position is the first position. According to the aspect, when the filter regeneration condition is established, and the engine that performs fuel cut is motored by the first motor when the shift position is the second position, the time needed to complete the regeneration of the filter can be shortened.

In the hybrid vehicle according to the aspect, the electronic control unit may be configured to control the engine that performs fuel cut to be motored by the first motor at a rotational speed higher than a rotational speed lower limit when the output of the braking force to the driving shaft is needed. The electronic control unit may be configured to set the rotational speed lower limit such that the rotational speed lower limit when the filter regeneration condition is established is higher than the rotational speed lower limit when the filter regeneration condition is not established.

In the hybrid vehicle according to the aspect, when the filter regeneration condition is established, the electronic control unit may be configured to set the rotational speed lower limit such that the rotational speed lower limit at a second position, at which the needed braking force is higher than that of when a shift position is a first position, is higher than of the rotational speed lower limit when the shift position is the first position.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments for carrying out the present disclosure will be described with reference to examples.

Figure 1:
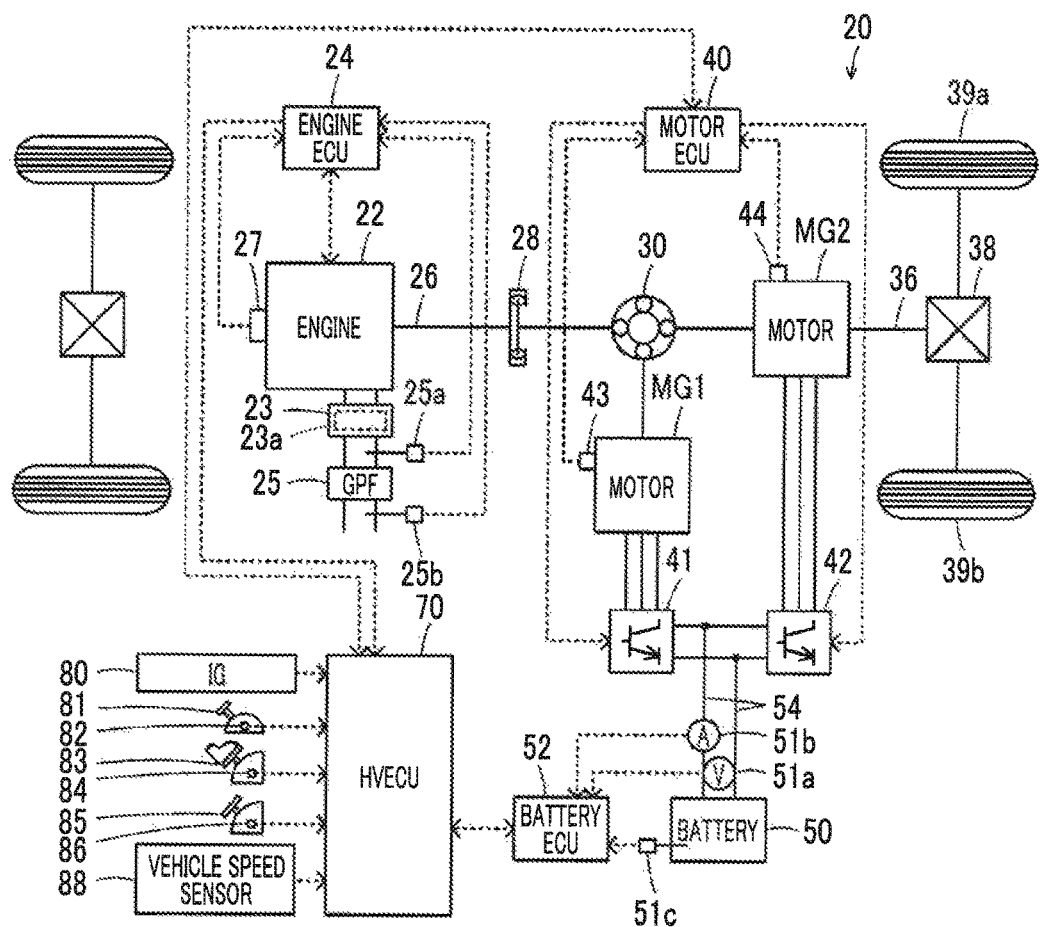
FIG. 1 is a configuration diagram schematically illustrating the configuration of a hybrid vehicle as an example of the present disclosure.

FIG. 1 is a configuration diagram schematically illustrating the configuration of a hybrid vehicle 20 as an example of the present disclosure. As illustrated in the figure, the hybrid vehicle 20 of the example includes an engine 22, a planetary gear 30, first and second motors MG1, MG2, inverters 41, 42, a battery 50 as a power storage device, and a hybrid electronic control unit (hereinafter, referred to as "HVECU") 70.

The engine 22 is configured as an internal combustion engine that outputs power using gasoline, diesel fuel, or the like as a fuel. An exhaust gas control apparatus 23 and a particulate matter removing filter (hereinafter, referred to as "PM filter") 25 are attached to the exhaust passage of the engine 22. The exhaust gas control apparatus 23 is filled with a catalyst 23a that removes unburned fuel and nitrogen oxides in the exhaust gas. The PM filter 25 is formed as a porous filter made of ceramic, stainless steel, or the like and removes particulate matter (PM) such as soot in the exhaust gas. The operation of the engine 22 is controlled by an engine electronic control unit (hereinafter, referred to as "engine ECU") 24.

Although not illustrated in the figure, the engine ECU 24 is configured as a microprocessor mainly including a CPU, and includes, in addition to the CPU, a ROM that stores processing programs, a RAM that temporarily stores data, input/output ports, and communication ports. Signals from various sensors needed for controlling the operation of the engine 22 are input to the engine ECU 24 via the input ports. Examples of the signals input to the engine ECU 24 include a crank angle θcr from a crank position sensor 27 that detects the rotational position of a crankshaft 26 and a coolant temperature Tw from a coolant temperature sensor (not illustrated) that measures the temperature of the coolant of the engine 22. In addition, examples thereof also include a throttle valve opening degree TH from a throttle valve position sensor (not illustrated) that detects the position of a throttle valve, an intake air amount Qa from an air flow meter (not illustrated) attached to an intake pipe, and an intake air temperature Ta from a temperature sensor (not illustrated) attached to the intake pipe. Furthermore, examples thereof also include pressures P1, P2 from pressure sensors 25a, 25b attached to the upstream side and the downstream side of the PM filter 25 of the exhaust passage. Various control signals for controlling the operation of the engine 22 are output from the engine ECU 24 via the output ports. Examples of signals output from the engine ECU 24 include a drive control signal for a throttle motor that adjusts the position of the throttle valve, a drive control signal for a fuel injection valve, and a drive control signal for an ignition coil integrated with an igniter. The engine ECU 24 is connected to the HVECU 70 via the communication port. The engine ECU 24 calculates a rotational speed Ne of the engine 22 based on the crank angle $\theta cr$ from the crank position sensor 27. In addition, the engine ECU 24 also calculates, based on the intake air amount Qa from the air flow meter and the rotational speed Ne of the engine 22, a volumetric efficiency (the ratio of the volume of the air actually drawn in one cycle to the stroke volume per cycle of the engine 22) KL. Furthermore, the engine ECU 24 calculates (estimates) a PM accumulation amount Qpm as the accumulation amount of the particulate matter accumulated on the PM filter 25 based on the pressure difference $\Delta P$ ($\Delta P = P1 - P2$) between the pressures P1, P2 from the pressure sensors 25a, 25b, or calculates (estimates) a filter temperature Tf as the temperature of the PM filter 25 based on the operation state (the rotational speed Ne and volumetric efficiency KL) of the engine 22.

The planetary gear 30 is configured as a single-pinion planetary gear mechanism. The rotor of the first motor MG1 is connected to the sun gear of the planetary gear 30. A driving shaft 36 connected to driving wheels 39a, 39b via a differential gear 38 is connected to the ring gear of the planetary gear 30. The crankshaft 26 of the engine 22 is connected to the carrier of the planetary gear 30 via a damper 28.

For example, the first motor MG1 is configured as a synchronous generator motor, and as described above, the rotor thereof is connected to the sun gear of the planetary gear 30. For example, the second motor MG2 is configured as a synchronous generator motor, and the rotor thereof is connected to the driving shaft 36. The inverters 41, 42 are connected to the first and second motors MG1, MG2 and are also connected to the battery 50 via electric power lines 54. The first and second motors MG1, MG2 are rotatably driven by switching control of a plurality of switching elements (not illustrated) of the inverters 41, 42 by a motor electronic control unit (hereinafter, referred to as "motor ECU") 40.

Although not illustrated in the figure, the motor ECU 40 is configured as a microprocessor mainly including a CPU, and includes, in addition to the CPU, a ROM that stores processing programs, a RAM that temporarily stores data, input/output ports, and communication ports. Signals from various sensors needed for controlling the driving of the first and second motors MG1, MG2, for example, rotational positions $\theta m1$, $\theta m2$ from rotational position detection sensors 43, 44 that detect the rotational positions of the rotors of the first and second motors MG1, MG2, and phase currents from a current sensor 51b that measures the current flowing through each phase of the first and second motors MG1, MG2, are input to the motor ECU 40 via the input ports. Switching control signals for the switching elements (not illustrated) of the inverters 41, 42 and the like are output from the motor ECU 40 via the output ports. The motor ECU 40 is connected to the HVECU 70 via the communication port. The motor ECU 40 calculates, based on the rotational positions $\theta m1$, $\theta m2$ of the rotors of the first and second motors MG1, MG2 from rotational position detection sensors 43, 44, rotational speeds Nm1, Nm2 of the first and second motors MG1, MG2.

For example, the battery 50 is configured as a lithium-ion secondary battery or a nickel-hydrogen secondary battery, and is connected to the inverters 41, 42 via the electric power lines 54. The battery 50 is managed by a battery electronic control unit (hereinafter referred to as "battery ECU") 52.

Although not illustrated in the figure, the battery ECU 52 is configured as a microprocessor mainly including a CPU, and includes, in addition to the CPU, a ROM that stores processing programs, a RAM that temporarily stores data, input/output ports, and communication ports. Signals from various sensors needed for managing the battery 50 are input to the battery ECU 52 via the input ports. Examples of signals to be input to the battery ECU 52 include a voltage Vb of the battery 50 from a voltage sensor 51a installed between the terminals of the battery 50, a current Ib of the battery 50 from the current sensor 51b attached to the output terminal of the battery 50, and a temperature Tb of the battery 50 from a temperature sensor 51c attached to the battery 50. The battery ECU 52 is connected to the HVECU 70 via the communication port. The battery ECU 52 calculates a stored power ratio SOC based on the integrated value of the current Ib of the battery 50 from the current sensor 51b or calculates input/output limits Win, Wout based on the calculated stored power ratio SOC and the temperature Tb of the battery 50 from the temperature sensor 51c.

Although not illustrated in the figure, the HVECU 70 is configured as a microprocessor mainly including a CPU, and includes, in addition to the CPU, a ROM that stores processing programs, a RAM that temporarily stores data, input/output ports, and communication ports. Signals from various sensors are input to the HVECU 70 via the input ports. Examples of signals to be input to the HVECU 70 include an ignition signal from an ignition switch 80 and a shift position SP from a shift position sensor 82 that detects the operation position of a shift lever 81. In addition, examples thereof may further include an accelerator operation mount Acc from an accelerator pedal position sensor 84 that measures the depression amount of an accelerator pedal 83, a brake pedal position BP from a brake pedal position sensor 86 that measures the depression amount of a brake pedal 85, and a vehicle speed V from a vehicle speed sensor 88. As described above, the HVECU 70 is connected to the engine ECU 24, the motor ECU 40, and the battery ECU 52 via the communication ports.

Here, as the shift position SP, a parking position (P position), a reverse position (R position), a neutral position (N position), a forward position (D position), a brake position (B position), and the like are prepared. The B position is a position at which the driving force when acceleration is turned on is caused to be the same as that at the D position and the braking force when acceleration is turned off is caused to be greater than that at the D position.

In the hybrid vehicle 20 of the example configured as described above, a needed driving force for the driving shaft 36 is set based on the shift position SP, the accelerator operation amount Acc, and the vehicle speed V, and the operations of the engine 22 and the first and second motors MG1, MG2 are controlled such that a needed power corresponding to the needed driving force is output to the driving shaft 36. Examples of operation modes of the engine 22 and the first and second motors MG1, MG2 include the following modes (1) to (3). (1) Torque conversion operation mode: The operation of the engine 22 is controlled such that a power corresponding to the needed power is output from the engine 22. In addition, in the torque conversion operation mode, the driving of the first and second motors MG1, MG2 is controlled such that the all of the power output from the engine 22 is converted into a torque by the planetary gear 30 and the first and second motors MG1, MG2 and the needed power is output to the driving shaft 36. (2) Charging/discharging operation mode: The operation of the engine 22 is controlled such that a power corresponding to the sum of the needed power and an electric power needed for charging and discharging of the battery 50 is output from the engine 22. In addition, in the charging/discharging operation mode, the driving of the first and second motors MG1, MG2 is controlled such that all or a portion of the power output from the engine 22 is converted into a torque by the planetary gear 30 and the first and second motors MG1, MG2 with the charging and discharging of the battery 50 and the needed power is output to the driving shaft 36. (3) Motor operation mode: a mode in which the operation of the engine 22 is stopped and the driving of the second motor MG2 is controlled such that the needed power is output to the driving shaft 36.

Figure 2:
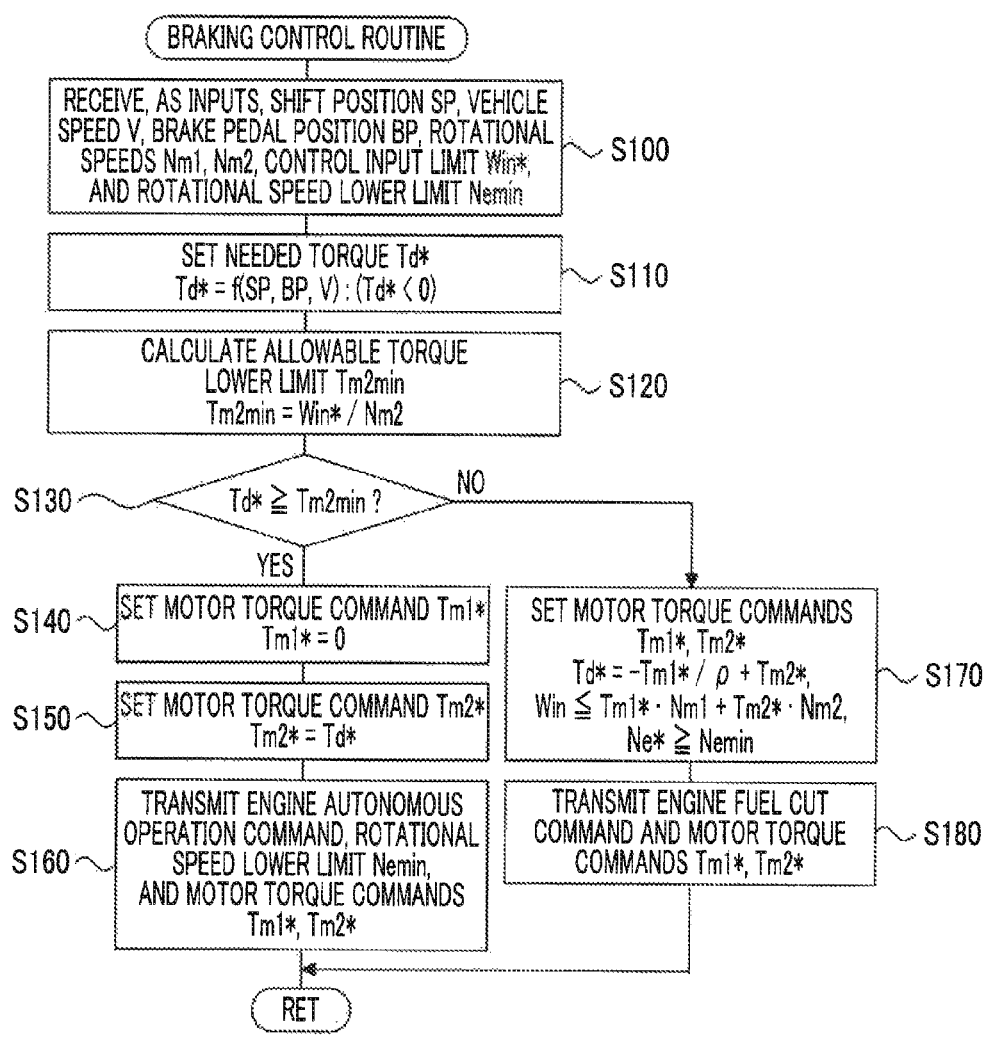
FIG. 2 is a flowchart showing an example of a braking control routine repeatedly executed by an HVECU of the example.

The operation of the hybrid vehicle 20 of the example configured as described above, and particularly, the operation when the output of the braking force to the driving shaft 36 is needed while the engine 22 is operated and the hybrid vehicle 20 travels forward will be described. Here, when the output of the braking force to the driving shaft 36 is needed may be when braking is tuned on or when acceleration is turned off and braking is turned off. FIG. 2 is a flowchart showing an example of a braking control routine repeatedly executed by the HVECU 70 of the example. In the following description, regarding each electric power, the electric power from the battery 50 toward the first and second motors MG1, MG2 is regarded as being positive.

When the braking control routine is executed, first, the HVECU 70 receives, as inputs, data such as the shift position SP, the brake pedal position BP, the vehicle speed V, the rotational speeds Nm1, Nm2 of the first and second motors MG1, MG2, a control input limit Win* as an allowable input electric power of the battery 50, and a rotational speed lower limit Nemin of the engine 22 (step S100). Here, as the shift position SP, a position (the D position or the B position) detected by the shift position sensor 82 is input. As the brake pedal position BP, a value detected by the brake pedal position sensor 86 is input. As the vehicle speed V, a value detected by the vehicle speed sensor 88 is input. As the rotational speeds Nm1, Nm2 of the first and second motors MG1, MG2, values calculated based on the rotational positions θm1, θm2 of the rotors of the first and second motors MG1, MG2 detected by the rotational position detection sensors 43, 44 are input. As the control input limit Win* of the battery 50 (negative value) and the rotational speed lower limit Nemin of the engine 22, values set by a control value setting routine, which will be described later, are input.

When the data is input in this manner, a needed torque Td* needed for the driving shaft 36 is set based on the input shift position SP (the D position or the B position) the brake pedal position BP, and the vehicle speed V (step S110). Since when the output of the braking force to the driving shaft 36 is considered, the needed torque Td* is set to a negative value. In the example, the needed torque Td* is set to decrease within the negative range (the absolute value of the needed torque Td* increases) as the vehicle speed V increases, decrease (the absolute value of the needed torque Td* increases) as the brake pedal position BP increases, and become smaller when the shift position SP is the B position than when the shift position SP is the D position (the absolute value of the needed torque Td* increases).

Subsequently, an allowable torque lower limit Tm2min as the lower limit of the allowable torque range of the second motor MG2 is set by dividing the control input limit Win* of the battery 50 by the rotational speed Nm2 of the second motor MG2 (step S120). The needed torque Td* and the allowable torque lower limit Tm2min of the second motor MG2 are compared to each other (step S130). The process of step S130 is a process of determining whether or not the needed torque Td* can be output by regenerative drive of the second motor MG2 within the range of the control input limit Win* of the battery 50. As described above, since the control input limit Win* is a negative value, the allowable torque lower limit Tm2min becomes a negative value during forward traveling (when the rotational speed Nm2 of the second motor MG2 is positive).

When the needed torque Td* is equal to or more than the allowable torque lower limit Tm2min, the HVECU 70 determines that the needed torque Td* can be output by the regenerative drive of the second motor MG2 within the range of the control input limit Win* of the battery 50, and sets a torque command Tm1* of the first motor MG1 to a value of zero (step S140). In addition, the needed torque Td* is set to a torque command Tm2* of the second motor MG2 (step S150).

Figure 3:
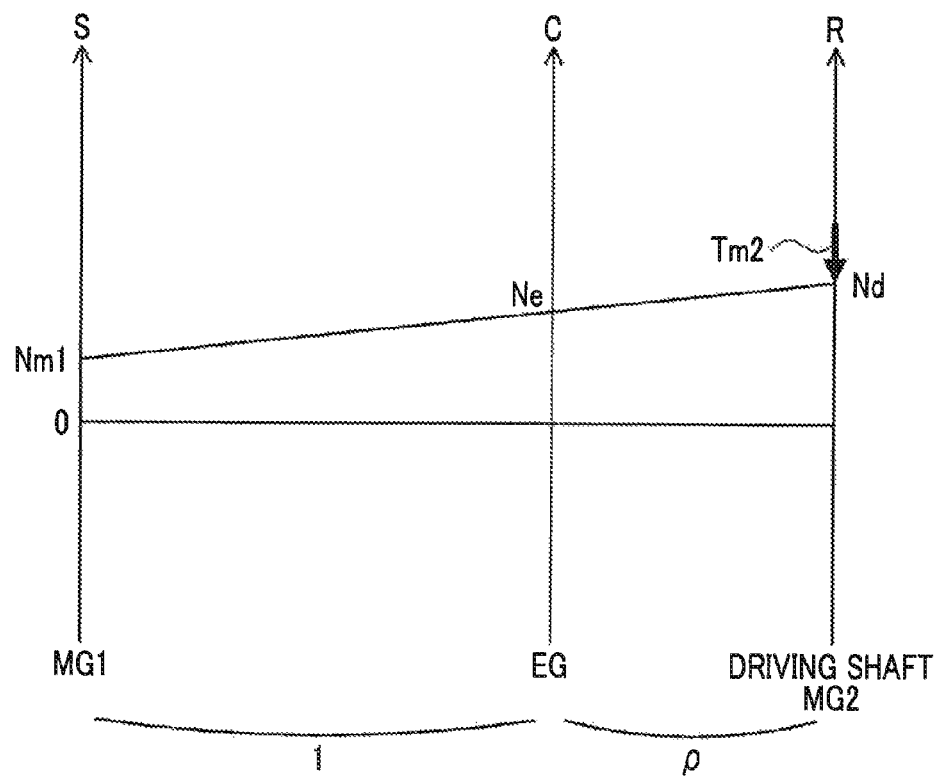
FIG. 3 is an explanatory view illustrating an example of a collinear diagram when a needed torque is output to a driving shaft by regenerative drive of a motor.

An self-sustainable operation command and the rotational speed lower limit Nemin of the engine 22 are transmitted to the engine ECU 24 and the torque commands Tm1*, Tm2* of the first and second motors MG1, MG2 are transmitted to the motor ECU 40 (step S160), and the routine is ended. When the engine ECU 24 receives the self-sustainable operation command and the rotational speed lower limit Nemin of the engine 22, the engine ECU 24 performs intake air amount control, fuel injection control, ignition control, and the like for the engine 22 such that the engine 22 performs an self-sustainable operation (no-load operation) at the rotational speed lower limit Nemin. When the motor ECU 40 receives the torque commands Tm1*, Tm2* of the first and second motors MG1, MG2, the motor ECU 40 performs the switching control of the switching elements of the inverters 41, 42 such that the first and second motors MG1, MG2 are driven under the torque commands Tm1*, Tm2*. FIG. 3 is an explanatory view illustrating an example of a collinear diagram when the needed torque Td* is output to the driving shaft 36 by the regenerative drive of the second motor MG2. In the diagram, the S axis on the left represents the rotational speed of the sun gear of the planetary gear 30, which is the rotational speed Nm1 of the first motor MG1. The C axis represents the rotational speed of the carrier of the planetary gear 30, which is the rotational speed Ne of the engine 22. The R axis represents the rotational speed Nr of the ring gear of the planetary gear 30, which is the rotational speed Nm2 of the second motor MG2. In addition, "ρ" represents the gear ratio of the planetary gear 30 ((the number of teeth of the sun gear)/(the number of teeth of the ring gear)). With the control, the needed torque Td* can be output to the driving shaft 36 by the regenerative drive of the second motor MG2 while the engine 22 is allowed to perform the self-sustainable operation at the rotational speed lower limit Nemin.

Figure 4:
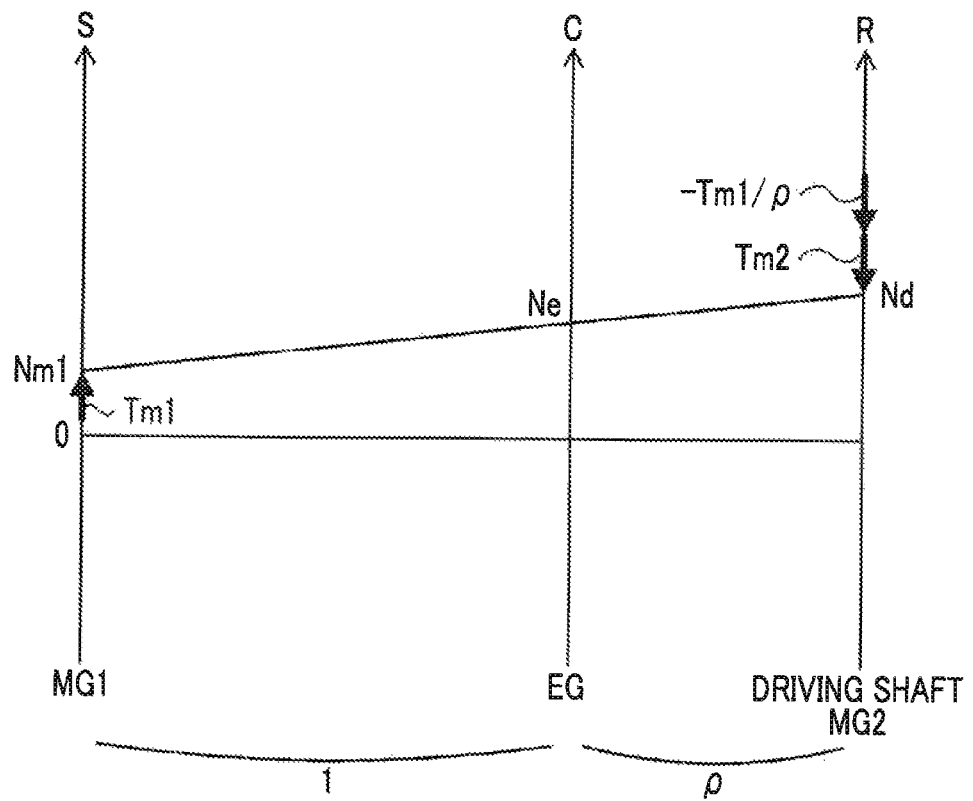
FIG. 4 is an explanatory view illustrating an example of a collinear diagram when the regenerative drive of the motor and motoring of an engine that performs fuel cut using the motor are performed and FIG. 5 is a flowchart showing an example of a control value setting routine executed by the HVECU of the example.

When the needed torque Td* is less than the allowable torque lower limit Tm2min in step S130, the HVECU 70 determines that the needed torque Td* cannot be output by regenerative drive of the second motor MG2 within the range of the control input limit Win* of the battery 50, and the torque commands Tm1*, Tm2 of the first and second motors MG1, MG2 are set such that the needed torque Td* is output to the driving shaft 36 by the regenerative drive of the second motor MG2 and motoring of the engine 22 that performs fuel cut using the first motor MG1 (step S170). FIG. 4 is an explanatory view illustrating an example of a collinear diagram when the regenerative drive of the second motor MG2 and the motoring of the engine 22 that performs fuel cut using the first motor MG1 an performed. In the diagram, two thick arrows on the R axis indicate a torque that is output from the first motor MG1 and is applied to the driving shaft 36 via the planetary gear 30 and a torque that is output from the second motor MG2 and is applied to the driving shaft 36. In the example, in the process of step S170, the torque commands Tm1*, Tm2* of the first and second motors MG1, MG2 are set to satisfy the following three conditions. The first condition may be a condition that the sum of the torque $(-Tm1^*/\rho)$ applied to the driving shaft 36 from the first motor MG1 via the planetary gear 30 when the first motor MG1 is driven under the torque command Tm1* and the torque applied to the driving shaft 36 when the second motor MG2 is driven under the torque command Tm2* becomes equal to the needed torque Td*. The second condition may be, as represented by Expression (2), a condition that the sum of an electric power Pm1 of the first motor MG1 obtained as the product of the torque command Tm1* and the rotational speed Nm1 of the first motor MG1 and an electric power Pm2 of the second motor MG2 obtained as the product of the torque command Tm2* and the rotational speed Nm2 of the second motor MG2 is within the range of the control input limit Win*. The third condition may be a condition that a target rotational speed Ne* of the engine 22 when the engine 22 that performs the fuel cut is motored by the first motor MG1 is set to a rotational speed equal to or more than the rotational speed lower limit Nemin. As can be seen from the collinear diagram, the rotational speed Ne of the engine 22 and the rotational speeds Nm1, Nm2 of the first and second motors MG1, MG2 satisfy the relationship of Expression (3). In addition, the torque command Tm1* of the first motor MG1 is set to increase as the target rotational speed Ne* of the engine 22 (friction of the engine 22) increases.

$$Td^* = -Tm1^*/\rho + Tm2^* \quad (1)$$

$$Win \le Tm1^* \cdot Nm1 + Tm2^* \cdot Nm2 \quad (2)$$

$$Ne = (Nm1 \cdot \rho + Nm2)/(1+\rho) \quad (3)$$

A fuel cut command of the engine 22 is transmitted to the engine ECU 24 and the torque commands Tm1*, Tm2* of the first and second motors MG1, MG2 are transmitted to the motor ECU 40 (step S180), and the routine is ended. When the engine ECU 24 receives the fuel cut command, the injection of the fuel into the engine 22 is stopped. Control of the inverters 41, 42 by the motor ECU 40 is described above. With the control, the needed torque Td* can be output to the driving shaft 36 by the regenerative drive of the second motor MG2 and the motoring of the engine 22 that performs the fuel cut using the first motor MG1.

Figure 5:
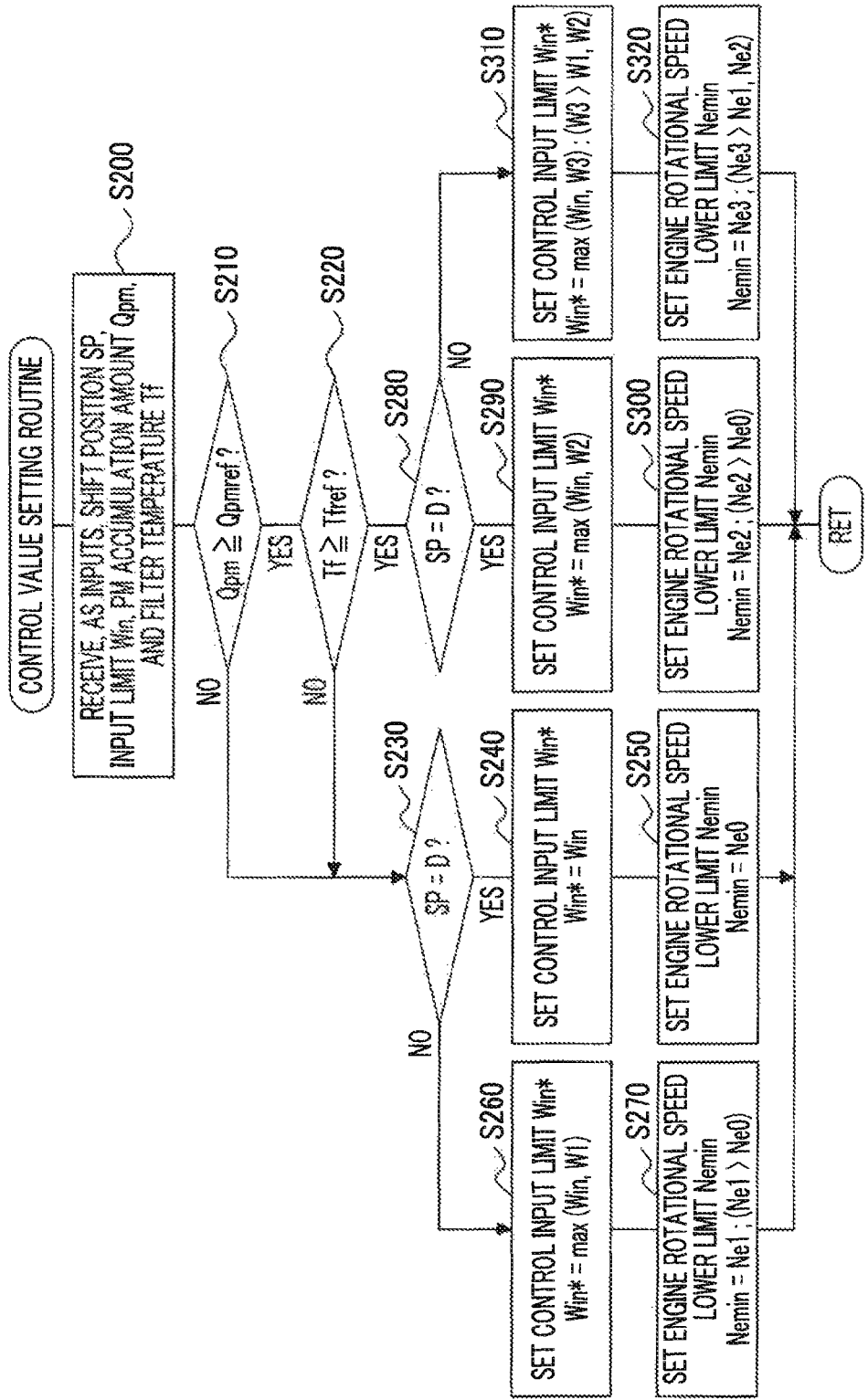

Next, a process of setting the control input limit Win* of the battery 50 and the rotational speed lower limit Nemin of the engine 22 used in the braking control routine in FIG. 2 will be described. FIG. 5 is a flowchart showing an example of the control value setting routine executed by the HVECU 70 of the example. The routine is repeatedly executed in parallel with the braking control routine in FIG. 2.

When the control value setting routine is executed, first, the HVECU 70 receives, as inputs, data such as the shift position SP, the PM accumulation amount Qpm, the filter temperature Tf, and the input limit Win of the battery 50 (step S200). Here, a method of inputting the shift position SP is described above. As the PM accumulation amount Qpm, a value calculated (estimated) based on the pressure difference ΔP (ΔP=P1−P2) between the pressures P1, P2 from the pressure sensors 25a, 25b is input through communication from the engine ECU 24. As the filter temperature Tf, a value calculated (estimated) based on the operation state of the engine 22 is input through communication from the engine ECU 24. As the input limit Win of the battery 50, a value calculated based on the stored power ratio SOC and the temperature Tb of the battery 50 is input through communication from the battery ECU 52. The input limit Win of the battery 50 is set to a rated value Wrt (for example, −30 kW, −35 kW, or −40 kW) when the temperature Tb of the battery 50 is within a normal temperature range (for example, a range from −5° C., 0° C., or 5° C. to 35° C., 40° C., or 45° C.) and the stored power ratio SOC is within a normal ratio range (for example, a range from 25%, 30%, or 35% to 55%, 60%, or 65%). In the following description, a case where the input limit Win of the battery 50 is set to the rated value Wrt is considered.

When the data is input in this manner, the input PM accumulation amount Qpm is compared to a threshold Qpmref (step S210). When the PM accumulation amount Qpm is equal to or more than the threshold Qpmref, the filter temperature Tf is compared to a threshold Tfref (step S220). Here, the threshold Qpmref is the lower limit of the PM accumulation amount range by which it can be determined that regeneration of the PM filter 25 is needed. The threshold Tfref is the lower limit of the regenerable temperature range suitable for regeneration of the PM filter 25, and for example, may be 580° C., 600° C., or 620° C. The processes in steps S210 and S220 are processes for determining whether or not a condition that the PM accumulation amount Qpm is equal to or more than the threshold Qpmref and the filter temperature Tf is equal to or more than the threshold Tfref, that is, a condition that regeneration of the PM filter 25 is needed and the filter temperature Tf is within the regenerable temperature range (hereinafter, referred to as a "filter regeneration condition") is established.

When the PM accumulation amount Qpm is less than the threshold Qpmref in step S210, or when the PM accumulation amount Qpm is equal to or more than the threshold Qpmref in step S210 and the filter temperature Tf is lower than the threshold Tfref in step S220, the HVECU 70 determines that the filter regeneration condition is not established, and the HVECU 70 determines whether the shift position SP is the D position or the B position (step S230). When the HVECU 70 determines that the shift position SP is the D position, the input limit Win of the battery 50 is set to the control input limit Win* as the allowable input electric power of the battery 50 (step S240). In addition, the rotational speed lower limit Nemin of the engine 22 is set to a rotational speed Ne0 (step S250), and the routine is ended. Here, the rotational speed Ne0 may be a rotational speed that tends to increase as the vehicle speed V increases (for example, a rotational speed of 1,000 rpm, 1,100 rpm, or 1,200 rpm when the vehicle speed V is 60 km/h), or may be a constant rotational speed regardless of the vehicle speed V.

When the HVECU 70 determines that the shift position SP is the B position in step S230, the control input limit Win* of the battery 50 is set by guarding the lower limit of the input limit Win of the battery 50 with a predetermined value W1 higher than the rated value Wrt (the absolute value of the predetermined value W1 is smaller) (step S260). In addition, the rotational speed lower limit Nemin of the engine 22 is set to a rotational speed Ne1 higher than the rotational speed Ne0 (step S270), and the routine is ended. Here, the predetermined value W1 may be, for example, −11 kW, −13 kW, or −15 kW. Here, the rotational speed Ne1 may be a rotational speed that tends to increase as the vehicle speed V increases (for example, a rotational speed of 1,900 rpm, 2,000 rpm, or 2,100 rpm when the vehicle speed V is 60 km/h), or may be a constant rotational speed regardless of the vehicle speed V.

When the HVECU 70 determines that the PM accumulation amount Qpm is equal to or more than the threshold Qpmref in step S210 and the filter temperature Tf is equal to or higher than the threshold Tfref in step S220, the HVECU 70 determines that the filter regeneration condition is established, and the HVECU 70 determines whether the shift position SP is the D position or the B position (step S280). When the HVECU 70 determines that the shift position SP is the D position, the control input limit Win* of the battery 50 is set by guarding the lower limit of the input limit Win of the battery 50 with a predetermined value W2 higher than the rated value Wrt (the absolute value of the predetermined value W2 is smaller) (step S290). In addition, the rotational speed lower limit Nemin of the engine 22 is set to a rotational speed Ne2 higher than the rotational speed Ne0 (step S300), and the routine is ended. Here, the predetermined value W2 may be, for example, −13 kW, −15 kW, or −17 kW. The rotational speed Ne2 may be a rotational speed that tends to increase as the vehicle speed V increases (for example, a rotational speed of 1,700 rpm, 1,800 rpm, or 1,900 rpm when the vehicle speed V is 60 km/h), or may be a constant rotational speed regardless of the vehicle speed V.

When the HVECU 70 determines that the shift position SP is the B position in step S280, the control input limit Win* of the battery 50 is set by guarding the lower limit of the input limit Win of the battery 50 with a predetermined value W3 higher than the predetermined values W1, W2 (the absolute value of the predetermined value W3 is smaller) (step S310). In addition, the rotational speed lower limit Nemin of the engine 22 is set to a rotational speed Ne3 higher than the rotational speeds Ne1, Ne2 (step S320), and the routine is ended. Here, the predetermined value W3 may be, for example, −3 kW, −5 kW, or −7 kW. Here, the rotational speed Ne3 may be a rotational speed that tends to increase as the vehicle speed V increases (for example, a rotational speed of 2,700 rpm, 2,800 rpm, or 2,900 rpm when the vehicle speed V is 60 km/h), or may be a constant rotational speed regardless of the vehicle speed V.

However, when the filter regeneration condition is established, regeneration of the PM filter 25 is performed by allowing the engine 22 to perform fuel cut, supplying air (oxygen) to the PM filter 25, and burning the particulate matter accumulated on the PM filter 25.

In the example, when the filter regeneration condition is established, the control input limit Win* of the battery 50 is set to be higher than that of when the filter regeneration condition is not established (the absolute value of the control input limit Win* is smaller). Accordingly, when the filter regeneration condition is established, and the output of the braking force to the driving shaft 36 is needed, the HVECU 70 easily determines that the needed torque Td* is lower than the allowable torque lower limit Tm2min (=Win*/Nm2) (the needed torque Td* cannot be output by the regenerative drive of the second motor MG2 within the range of the control input limit Win* of the battery 50), and the fuel cut of the engine 22 is easily performed. As a result, an opportunity for regeneration of the PM filter 25 can be secured. Furthermore, when the filter regeneration condition is established, and the shift position SP is the B position, the control input limit Win* of the battery 50 is set to be higher than that of when the shift position SP is the D position (the absolute value of the control input limit Win* is smaller). Accordingly, when the filter regeneration condition is established, and the shift position SP is the B position and the output of the braking force to the driving shaft 36 is needed, the fuel cut of the engine 22 is easily performed, and thus an opportunity for regeneration of the PM filter 25 can be more reliably secured.

In addition, when the filter regeneration condition is established, the rotational speed lower limit Nemin of the engine 22 is set to the value higher than that of when the filter regeneration condition is not established. Accordingly, when the filter regeneration condition is established, and the engine 22 that performs the fuel cut is motored by the first motor MG1, a larger amount of air (oxygen) can be supplied to the PM filter 25, and the time needed to complete the regeneration of the PM filter 25 can be shortened. Furthermore, when the PM accumulation amount Qpm is equal to or more than the threshold Qpmref and the filter temperature Tf is equal to or more than the threshold Tfref, when the shift position SP is the D position, the rotational speed lower limit Nemin of the engine 22 is set to be higher than that of when the shift position SP is the B position. Accordingly, when the filter regeneration condition is established, and the shift position SP is the B position and the engine 22 that performs the fuel cut is motored by the first motor MG1, the time needed to complete the regeneration of the PM filter 25 can be shortened.

In the hybrid vehicle 20 of the example described above, when the output of the braking force to the driving shat 36 is needed, and the needed torque Td* can be output by the regenerative drive of the second motor MG2 within the range of the control input limit Win* of the battery 50, the engine 22 and the second motor MG2 are controlled such that the engine 22 self-sustainably operates and the needed torque Td* is output to the driving shaft 36 by the regenerative drive of the second motor MG2. In addition, when the output of the braking force to the driving shaft 36 is needed, and the needed torque Td* cannot be output by the regenerative drive of the second motor MG2 within the range of the control input limit Win* of the battery 50, the engine 22 and the first and second motors MG1, MG2 are controlled such that the needed torque Td* is output to the driving shaft 36 by the regenerative drive of the second motor MG2 and motoring of the engine 22 that performs fuel cut using the first motor MG1. When the control is performed, and the filter regeneration condition that the PM accumulation amount Qpm is equal to or more than the threshold Qpmref and the filter temperature Tf is equal to or more than the threshold Tfref is established, the control input limit Win* of the battery 50 is set to be higher than that of when the filter regeneration condition is not established (the absolute value of the control input limit Win* is smaller). Accordingly, when the filter regeneration condition is established, and the output of the braking force to the driving shaft 36 is needed, the HVECU 70 easily determines that the needed torque Td* cannot be output by the regenerative drive of the second motor MG2 within the range of the control input limit Win* of the battery 50, and the fuel cut of the engine 22 is easily performed. As a result, an opportunity for regeneration of the PM filter 25 can be secured.

In the hybrid vehicle 20 of the example, when the filter regeneration condition is established, and the shift position SP is the D position, the control input limit Win* of the battery 50 is set by guarding the lower limit of the input limit Win of the battery 50 with the predetermined value W2. When the shift position SP is the B position, the control input limit Win* of the battery 50 is set by guarding the lower limit of the input limit Win of the battery 50 with the predetermined value W3 higher than the predetermined value W2 (the absolute value of the predetermined value W3 is smaller). However, when the filter regeneration condition is established, regardless of whether the shift position SP is the D position or the B position, the control input limit Win* of the battery 50 may be set by guarding the lower limit of the input limit Win of the battery 50 with the predetermined value W3.

In the hybrid vehicle 20 of the example, when the filter regeneration condition is established, and the shift position SP is the D position, the rotational speed lower limit Nemin of the engine 22 is set to 2 the rotational speed Ne2. When the shift position SP is the B position, the rotational speed lower limit Nemin of the engine 22 is set to the rotational speed Ne3 higher than the rotational speed Ne2. However, when the filter regeneration condition is established, regardless of whether the shift position SP is the D position or the B position, the rotational speed lower limit Nemin of the engine 22 may be set to the rotational speed Ne3.

In the hybrid vehicle 20 of the example, when the filter regeneration condition is established, the rotational speed lower limit Nemin of the engine 22 is set to be higher than that of when the filter regeneration condition is not established. However, the rotational speed lower limit Nemin of the engine 22 may also be the same regardless of whether or not the filter regeneration condition is established.

In the hybrid vehicle 20 of the example, as the shift position SP, the parking position (P position), the reverse position (R position), the neutral position (N position), the forward position (D position), and the brake position (B position) are prepared. However, as the shift position SP, in addition to the positions mentioned above or instead of the B position among the positions mentioned above, a sequential position (S position) may also be provided. The S position is a position at which the driving force when acceleration is turned on or the braking force when acceleration is turned off (a higher braking force than that at the D position) is changed according to the gear stage S of a virtual step-variable transmission. Accordingly, at the S position, a driver can have a shifting sensation due to the virtual step-variable transmission. As the virtual gear stage S, a 4-speed transmission, a 5-speed transmission, a 6-speed transmission, or the like may be considered.

When the shift position SP is the S position can be considered in the same manner as when the shift position SP is the B position in the braking control routine in FIG. 2 or the control value setting routine in FIG. 5. For example, in the process of step S110 of the braking control routine in FIG. 2, the needed torque Td* may be set to decrease as the gear stage S is shifted to a lower gear stage, within a range lower than that of when the shift position SP is the D position (the absolute value of the needed torque Td* is higher) and within a negative range. In addition, in the process of step S270 of the control value setting routine in FIG. 5, the rotational speed Ne1 may be a rotational speed that increases as the gear stage S is shifted to a lower gear stage, within a range higher than the rotational speed Ne0. Furthermore, in the process of step S320 of the control value setting routine in FIG. 5, the rotational speed Ne3 may be a rotational speed that increases as the gear stage S is shifted to a lower gear stage, within a range higher than the rotational speeds Ne1, Ne2. In this case, the same effects as when the shift position SP is the B position can be exhibited.

In the hybrid vehicle 20 of the example, although not particularly described, the rotational speed lower limit Nemin of the engine 22 set by the control value setting routine in FIG. 5 may be used when the output of the braking force to the driving shaft 36 is needed (when the braking control routine in FIG. 2 is executed), as well as when the output of the driving force to the driving shaft 36 is needed (when acceleration is turned on). In this case, even when the output of any of the driving force and the braking force to the driving shaft 36 is needed, the rotational speed lower limit Nemin of the engine 22 is the same. Accordingly, variation (a reduction) in the rotational speed Ne of the engine 22 with a driver acceleration operation (on or off) can be suppressed, and the driver can be suppressed from feeling a sense of discomfort.

In the hybrid vehicle 20 of the example, the battery 50 is used as the power storage device, but a capacitor may also be used.

In the hybrid vehicle 20 of the example the engine ECU 24, the motor ECU 40, the battery ECU 52, and the HVECU 70 are provided. However, at least two of the components may be configured as a single electronic control unit.

The correspondence between the main elements of the example and the main elements of the present disclosure described in "SUMMARY" will be described. In the example, the engine 22 corresponds to "engine", the first motor MG1 and the second motor MG2 correspond to "motor", the planetary gear 30 corresponds to "planetary gear", the battery 50 corresponds to "power storage device", the HVECU 70, the engine ECU 24, the motor ECU 40, and the battery ECU 52 correspond to "electronic control unit".

The correspondence between the main elements of the example and the main elements of the present disclosure described in "SUMMARY" is an example for specifically describing the embodiments for carrying out the present disclosure described in "SUMMARY" by the example, and does not limit the elements of the present disclosure described in "SUMMARY". That is, the interpretation of the present disclosure described in "SUMMARY" should be made based on the description in "SUMMARY", and the example is merely a specific example of the present disclosure described in "SUMMARY".

Although the embodiments for carrying out the present disclosure have been described above using the examples, an applicable embodiment of the present disclosure is not limited to the examples, and various modifications may be made without departing from the gist of the present disclosure.

The present disclosure is applicable to the manufacturing industry of hybrid vehicles and the like.

What is claimed is:
1. A hybrid vehicle comprising:
an engine having a filter that removes particulate matter in an exhaust passage;
a first motor;
a planetary gear having three rotating elements, the planetary gear being configured such that the three rotating elements are arranged in order in a collinear diagram, the three rotating elements being respectively connected to the first motor, the engine, and a driving shaft connected to an axle of the hybrid vehicle in the order that the three rotating elements are arranged in the collinear diagram;

a second motor connected to the driving shaft;

a power storage device configured to exchange electric power with the first motor and the second motor; and an electronic control unit configured to:
- when an output of a braking force to the driving shaft is needed, and a needed braking force can be output by regenerative drive of the second motor within a range of an allowable input electric power of the power storage device, control the engine to self-sustainably operate and control the second motor to perform the regenerative drive to cause the second motor to output the needed braking force to the driving shaft;
- when the output of the braking force to the driving shaft is needed, and the needed braking force cannot be output by the regenerative drive of the second motor within the range of the allowable input electric power of the power storage device, control the engine, the first motor, and the second motor such that the needed braking force is output to the driving shaft by the regenerative drive of the second motor and motoring of the engine that performs fuel cut using the first motor; and
- when a filter regeneration condition that an accumulation amount of the particulate matter on the filter is equal to or more than a predetermined accumulation amount and a temperature of the filter is equal to or higher than a predetermined temperature is established, set the allowable input electric power to be lower than that of when the filter regeneration condition is not established.

2. The hybrid vehicle according to claim 1, wherein the electronic control unit is configured to, when the filter regeneration condition is established, set the allowable input electric power such that the allowable input electric power at a second position, at which the needed braking force is higher than that of when a shift position of the hybrid vehicle is a first position, is lower than the allowable input electric power of when the shift position is the first position.

3. The hybrid vehicle according to claim 1, wherein:
- the electronic control unit is configured to control the engine to cause the engine to self-sustainably operate at a rotational speed lower limit when the output of the braking force to the driving shaft is needed; and
- the electronic control unit is configured to set the rotational speed lower limit such that the rotational speed lower limit when the filter regeneration condition is established is higher than the rotational speed lower limit when the filter regeneration condition is not established.

4. The hybrid vehicle according to claim 3, wherein, when the filter regeneration condition is established, the electronic control unit is configured to set the rotational speed lower limit such that the rotational speed lower limit at a second position, at which the needed braking force is higher than that of when a shift position is a first position, is higher than the rotational speed lower limit when the shift position is the first position.

5. The hybrid vehicle according to claim 1, wherein:
- the electronic control unit is configured to control the engine that performs fuel cut to be motored by the first motor at a rotational speed higher than a rotational speed lower limit when the output of the braking force to the driving shaft is needed; and
- the electronic control unit is configured to set the rotational speed lower limit such that the rotational speed lower limit when the filter regeneration condition is established is higher than the rotational speed lower limit when the filter regeneration condition is not established.

6. The hybrid vehicle according to claim 5, wherein, when the filter regeneration condition is established, the electronic control unit is configured to set the rotational speed lower limit such that the rotational speed lower limit at a second position, at which the needed braking force is higher than that of when a shift position is a first position, is higher than the rotational speed lower limit when the shift position is the first position.

* * * * *